(12) United States Patent
Cho et al.

(10) Patent No.: US 9,863,487 B1
(45) Date of Patent: Jan. 9, 2018

(54) SHIFTING CONTROL METHOD FOR DCT VEHICLE

(71) Applicant: Hyundai Motor Company, Seoul (KR)

(72) Inventors: Sung Hyun Cho, Yongin-si (KR); Ju Hyun Nam, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/363,279

(22) Filed: Nov. 29, 2016

(30) Foreign Application Priority Data

Sep. 12, 2016 (KR) ........................ 10-2016-0117438

(51) Int. Cl.
*G06F 19/00* (2011.01)
*F16D 48/06* (2006.01)

(52) U.S. Cl.
CPC .... *F16D 48/06* (2013.01); *F16D 2500/10412* (2013.01); *F16D 2500/3065* (2013.01); *F16D 2500/3068* (2013.01)

(58) Field of Classification Search
CPC ........... F16D 48/06; F16D 2500/10412; F16D 2500/3068; F16D 2500/3065
See application file for complete search history.

(56) References Cited

U.S. PATENT DOCUMENTS

| 6,832,978 | B2 | 12/2004 | Buchanan et al. | |
|---|---|---|---|---|
| 7,494,442 | B2 | 2/2009 | Futamura et al. | |
| 8,577,572 | B2 | 11/2013 | Preisner et al. | |
| 2013/0296123 | A1* | 11/2013 | Doering | B60W 10/02 477/5 |
| 2015/0283995 | A1* | 10/2015 | Murata | B60K 6/30 477/5 |
| 2016/0123465 | A1 | 5/2016 | Cho et al. | |
| 2016/0138713 | A1* | 5/2016 | Cho | F16H 63/46 701/53 |
| 2016/0169303 | A1* | 6/2016 | No | F16D 48/06 477/175 |

FOREIGN PATENT DOCUMENTS

| JP | 2013-023155 A | 2/2013 |
|---|---|---|
| JP | 2013-036478 A | 2/2013 |
| KR | 10-2015-0125756 | 11/2015 |
| KR | 10-2016-0058368 | 5/2016 |
| KR | 10-2016-0064359 | 6/2016 |

* cited by examiner

*Primary Examiner* — David J Hlavka
(74) *Attorney, Agent, or Firm* — Brinks Gilson & Lione

(57) ABSTRACT

The present disclosure provides a shifting control method for a DCT vehicle which includes determining, by a controller, whether an entry condition is satisfied, the entry condition including information about whether a tip-out occurs while a power-on upshift torque phase is being performed, and when the entry condition is satisfied, responding, by the controller, to the tip-out where the controller controls an engaging clutch and a disengaging clutch using the calculated torque.

6 Claims, 3 Drawing Sheets

SHIFTING CONTROL METHOD FOR DCT VEHICLE

CROSS REFERENCE TO RELATED APPLICATION

The present application claims priority to and the benefit of Korean Patent Application No. 10-2016-0117438, filed on Sep. 12, 2016, which is incorporated herein by reference in its entirety.

FIELD

The present disclosure relates generally to a shifting control method for a Dual-Clutch Transmission (DCT) vehicle and, more particularly, to a control technique for responding to tip-out during a power-on upshift torque phase.

BACKGROUND

The statements in this section merely provide background information related to the present disclosure and may not constitute prior art.

"Power-on upshift" means shifting into a higher gear while a driver depresses an accelerator pedal. Additionally, "torque phase" refers to the process of controlling the two clutches of a DCT in such a way that the torque of a disengaging clutch is decreased whereas the torque of an engaging clutch is correspondingly increased in order to perform shifting. The torque phase is also referred to as "torque handover".

When such a torque phase finishes, the engine speed, which has changed along with the speed of the disengaging input shaft until the end of the torque phase, departs therefrom and changes to the speed of an engaging input shaft, which is set to a target gear level, whereby actual shifting is performed. This process is also called an "inertia phase".

SUMMARY

The present disclosure provides a shifting control method for a DCT vehicle by inhibiting a shift shock in the event of tip-out, that is, when a driver takes his or her foot off of an accelerator pedal during a power-on upshift torque phase.

A shifting control method for a DCT vehicle according to the present disclosure may be configured to include determining, by a controller, whether an entry condition is satisfied, the entry condition including information about whether a tip-out occurs while a power-on upshift torque phase is being performed; and when the entry condition is satisfied, responding, by the controller, to the tip-out in such a way that the controller controls an engaging clutch using a torque calculated based on an engine torque and a change in an engine speed and in such a way that the controller controls the disengaging clutch using a torque calculated so as to decrease more rapidly than before the entry condition is satisfied.

In determining whether the entry condition is satisfied, the entry condition may be determined to be satisfied when the tip-out occurs and when the engine torque at a time of occurrence of the tip-out is equal to or greater than a predetermined reference torque.

In determining whether the entry condition is satisfied, while the entry condition is not satisfied, a normal control may be performed in such a way that the controller calculates the torque of the disengaging clutch in a current control cycle by decreasing the torque of the disengaging clutch in a previous control cycle by an amount that is obtained by dividing the amount that the torque of the disengaging clutch is required to decrease during a remaining time of the torque phase by the remaining time, and controls the disengaging clutch using the calculated torque thereof.

In responding to the tip-out, the controller may calculate the torque of the disengaging clutch in the current control cycle by decreasing the torque of the disengaging clutch in the previous control cycle by the amount that is obtained by dividing the amount that the torque of the disengaging clutch is required to decrease during the remaining time of the torque phase by the remaining time and by further decreasing the decreased torque by a compensation torque, an absolute value increased by a predetermined reduced torque at every control cycle, and may control the disengaging clutch using the calculated torque thereof.

While responding to the tip-out, when a driver is determined to reaccelerate the vehicle based on an extent to which the driver depresses an accelerator pedal is equal to or higher than a predetermined level, a reaccelerating control may be performed in such a way that the controller calculates the torque of the disengaging clutch in the current control cycle by decreasing the torque of the disengaging clutch in the previous control cycle by the amount that is obtained by dividing the amount that the torque of the disengaging clutch is required to decrease during the remaining time of the torque phase by the remaining time and by further decreasing the decreased torque by the compensation torque calculated in the control cycle shortly before the driver is determined to reaccelerate the vehicle, and controls the disengaging clutch using the calculated torque thereof.

When a target time of the torque phase reaches while responding to the tip-out, the normal control, or the reaccelerating control, the controller may terminate the tip-out, the normal control, or the reaccelerating control that is being performed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
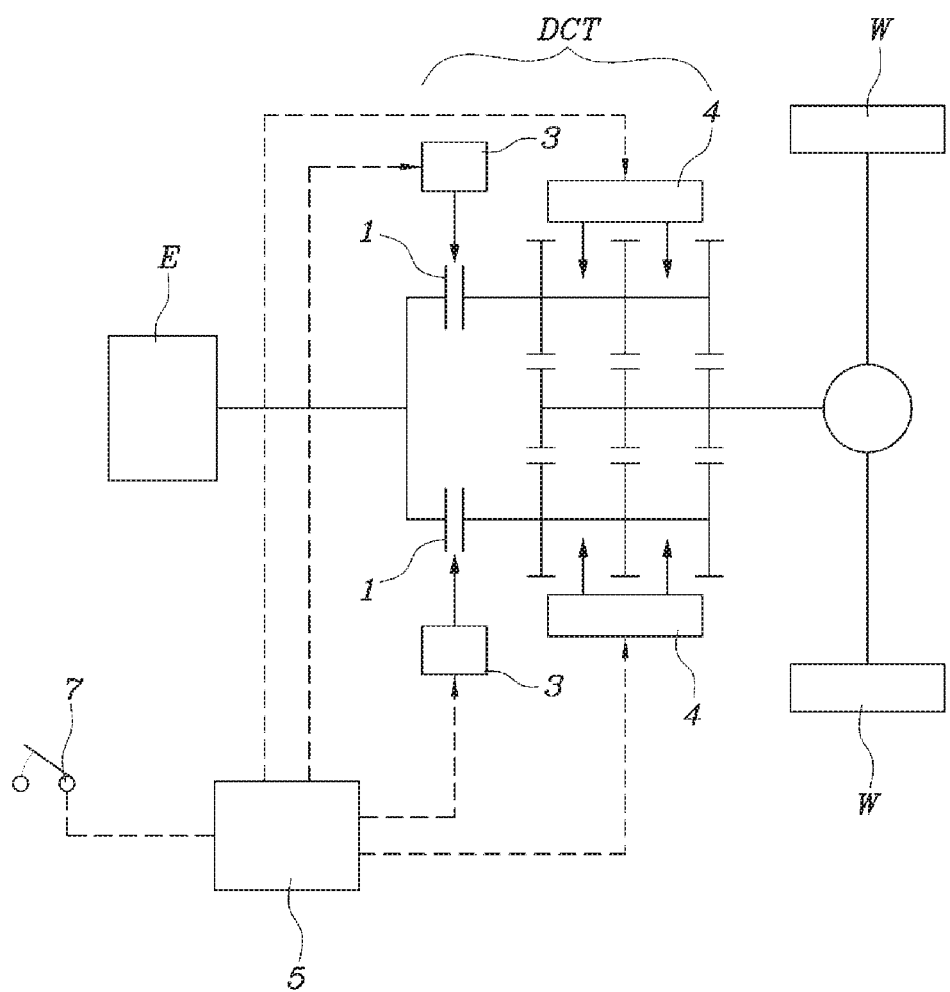
FIG. 1 is a configuration diagram of a vehicle to which a shifting control method for a DCT vehicle may be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, torque of an engine E is supplied to a driving wheel W through a Dual-Clutch Transmission (DCT), the two clutches 1 of the DCT are controlled by respective clutch actuators 3, shift gears are controlled by shift actuators 4, which select and actuate a synchronizer, the clutch actuators 3 and the shift actuators 4 are controlled by a controller 5, and the controller 5 receives a signal from an Accelerator Position Sensor (APS) 7 in order to receive information about the extent to which an accelerator pedal is depressed. Two clutches 1 of FIG. 1 can serve as an engaging clutch and a disengaging clutch during the gear shift. For example, when a gear shifts from a lower gear to a higher gear, one of the clutches that is associated with the lower gear works as the disengaging clutch and the other clutch that is associated with the higher gear works as the engaging clutch.

Of course, the controller 5 is additionally provided with information such as the engine torque, the engine speed and the like.

Figure 2:
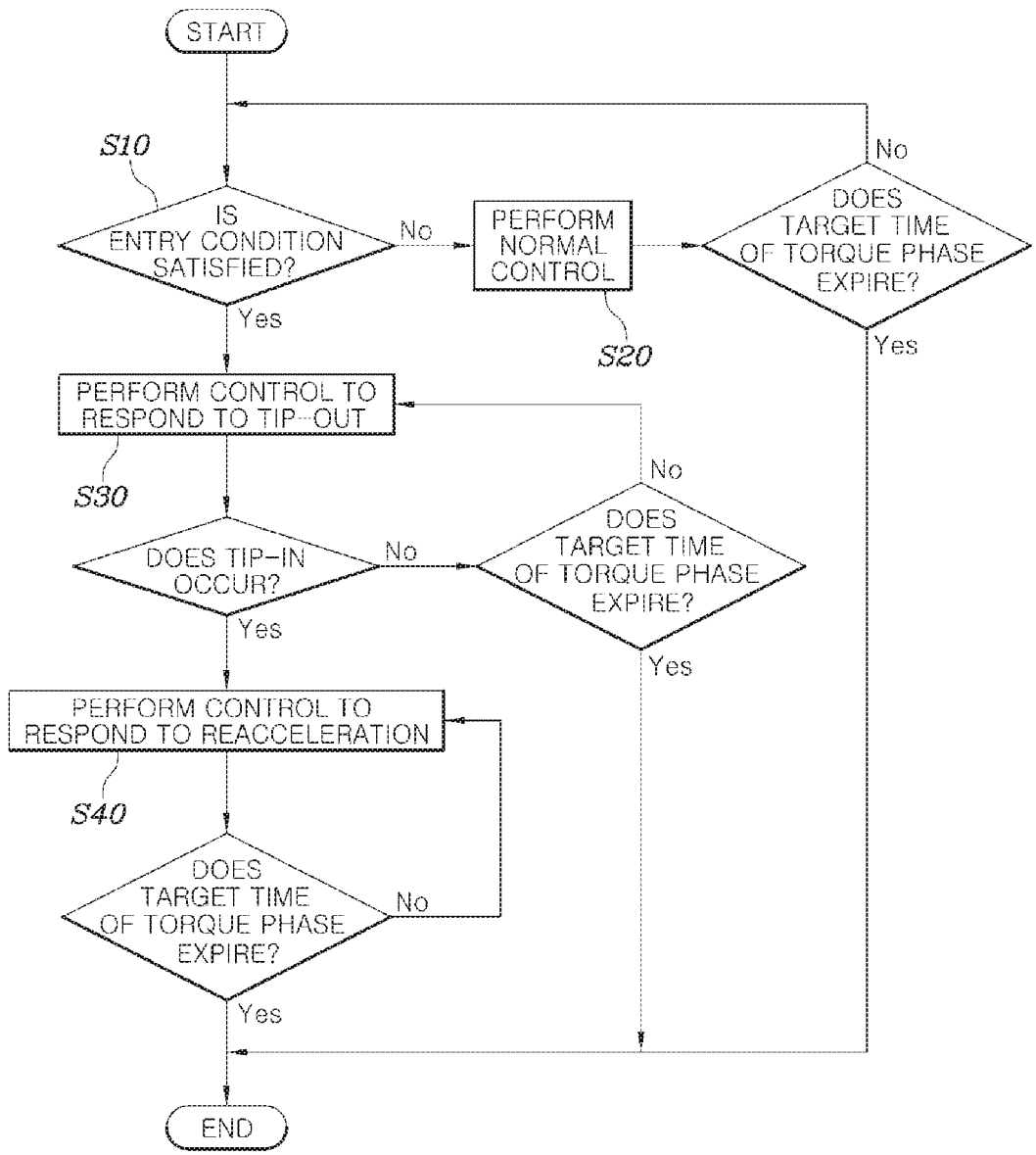
FIG. 2 is a flowchart showing an aspect of a shifting control method for a DCT vehicle.

Referring to FIG. 2, a shifting control method for a DCT vehicle according to the present disclosure includes a condition determination step (S10) in which a controller 5 determines whether an entry condition, including information about whether tip-out occurs while a power-on upshift torque phase is being performed, is satisfied; and a tip-out responding step (S30) in which, when the entry condition is satisfied, the controller 5 controls an engaging clutch using the torque thereof, which is calculated based on engine torque and a change in engine speed, calculates the torque of a disengaging clutch so as to decline more quickly than before the entry condition was satisfied, and controls the disengaging clutch using the calculated torque thereof.

While the entry condition is not satisfied as a result of performing the condition determination step (S10), a normal control step (S20), in which the torque of the disengaging clutch is calculated using a method that is configured to calculate the torque of the disengaging clutch in a normal torque phase, after which the disengaging clutch is controlled using the calculated torque thereof, is performed.

While the normal control step (S20) is performed, the torque of the engaging clutch must be controlled such that the sum of the torque of the engaging clutch and the torque of the disengaging clutch become equal to the engine torque. If interlocking occurs, in which the sum of the torque of the engaging clutch and the torque of the disengaging clutch exceeds the engine torque, the engine speed rapidly changes, and thus a shift shock occurs.

Meanwhile, in the condition determination step (S10), the entry condition is determined to be satisfied when tip-out occurs and when the engine torque obtained at the time of the occurrence of tip-out is equal to or greater than a predetermined reference torque.

In other words, in the state in which a torque phase is performed because upshift into a higher gear commences while a driver depresses an accelerator pedal, the driver may suddenly release the accelerator pedal, that is, tip-out may occur. At this time, if the engine torque is equal to or greater than the reference torque and if the application of shock to a power-train is predicted when the normal control step (S20) is continuously performed under this condition, the present disclosure performs the tip-out responding step (S30) in order to further reduce the torque of the disengaging clutch, whereby the occurrence of shocks is inhibited.

Therefore, it is desirable to set the reference torque in consideration of the above-mentioned situation. That is, the reference torque may be set to the lowest level of torque that may cause a shock to a power-train if the normal control step (S20) is continuously performed in the event of tip-out. For example, in the present form, the reference torque may be set to about 50 Nm.

As described above, the normal control step (S20) may be continuously performed until the end of the torque phase unless a driver stops depressing the accelerator pedal. At the normal control step (S20), the controller 5 calculates the torque of the disengaging clutch in the current control cycle by decreasing the torque of the disengaging clutch in the previous control cycle by an amount that is obtained by dividing the amount that the torque of the disengaging clutch is required to decrease during the remaining time of the torque phase by the remaining time, and then controls the disengaging clutch using the calculated torque thereof.

In other words, in the normal control step (S20), the torque of the disengaging clutch in the current control cycle t is calculated using the following equation:

disengaging clutch torque $(t)$=disengaging clutch torque $(t-1)-|$(target torque of disengaging clutch−disengaging clutch torque $(t-1)$)/(target time period of torque phase−elapsed time in torque phase)$|$ Here, the target torque of the disengaging clutch denotes the torque that the torque of the disengaging clutch must reach before the torque phase ends, and may be set to about 5 Nm.

Also, the target time period of torque phase is a total period within which the torque phase must be completed, and may be set to about 300 to 500 msec.

The elapsed time in torque phase indicates the time that has elapsed since the torque phase started.

For example, when the torque of the disengaging clutch in the previous control cycle t−1 is 60 Nm, the target torque of the disengaging clutch is 5 Nm, the target time period of the torque phase is 500 msec., the elapsed time in the torque phase is 300 msec., and the control cycle time is 10 msec., the torque of the disengaging clutch in the current control cycle is calculated as follows.

disengaging clutch torque $(t)$=60−$|$(5−60)/(500−300)$|$=59.725 Nm disengaging clutch torque $(t+1)$=59.725−$|$(5−59.725)/(500−310)$|$=59.436 Nm Meanwhile, at the tip-out responding step (S30), the controller 5 calculates the torque of the disengaging clutch in the current control cycle by decreasing the torque of the disengaging clutch in the previous control cycle by the amount that is obtained by dividing the amount that the torque of the disengaging clutch is required to decrease during the remaining time of the torque phase by the remaining time and by further decreasing the decreased torque by a compensation torque, an absolute value increased by a predetermined reduced torque every control cycle, and then controls the disengaging clutch using the calculated torque thereof.

In other words, at the tip-out responding step (S30), the torque of the disengaging clutch in the current control cycle t is calculated using the following equation:

disengaging clutch torque $(t)$=disengaging clutch torque $(t-1)-|$(target torque of disengaging clutch−disengaging clutch torque $(t-1)$)/(target time period of torque phase−elapsed time in torque phase)$|-|$compensation torque $(t)|$, where compensation torque $(t)$=$|$compensation torque $(t-1)|$+reduced torque Here, the reduced torque may be set to, for example, about 1~2 Nm/10 msec.

Accordingly, assuming that the initial value of the compensation torque is 0, that the reduced torque is 1 Nm/10 msec., and that the other conditions are the same as in the example of the normal control step (S20), the torque of the disengaging clutch in the current control cycle t at the tip-out responding step (S30) is calculated as follows.

disengaging clutch torque (t)=60−|(5−60)/(500−300)|−‖0|+1|=58.725 Nm disengaging clutch torque (t+1)=58.725−|(5−58.725)/(500−310)|−‖1|+1|=56.442 Nm Thus, the torque of the disengaging clutch decreases more rapidly than in the normal control step (S20).

Meanwhile, when the tip-out responding step (S30) is performed, the engaging clutch is controlled using the torque of the engaging clutch, which is calculated based on the engine torque and the change in the engine speed. That is, the torque of the engaging clutch may be calculated using the following equation:

engaging clutch torque $$Ta = Te - Je \times \frac{dNe}{dt}$$

where Te denotes engine torque, Je denotes the moment of rotational inertia of the engine, and Ne denotes the engine revolutions.

Figure 3:
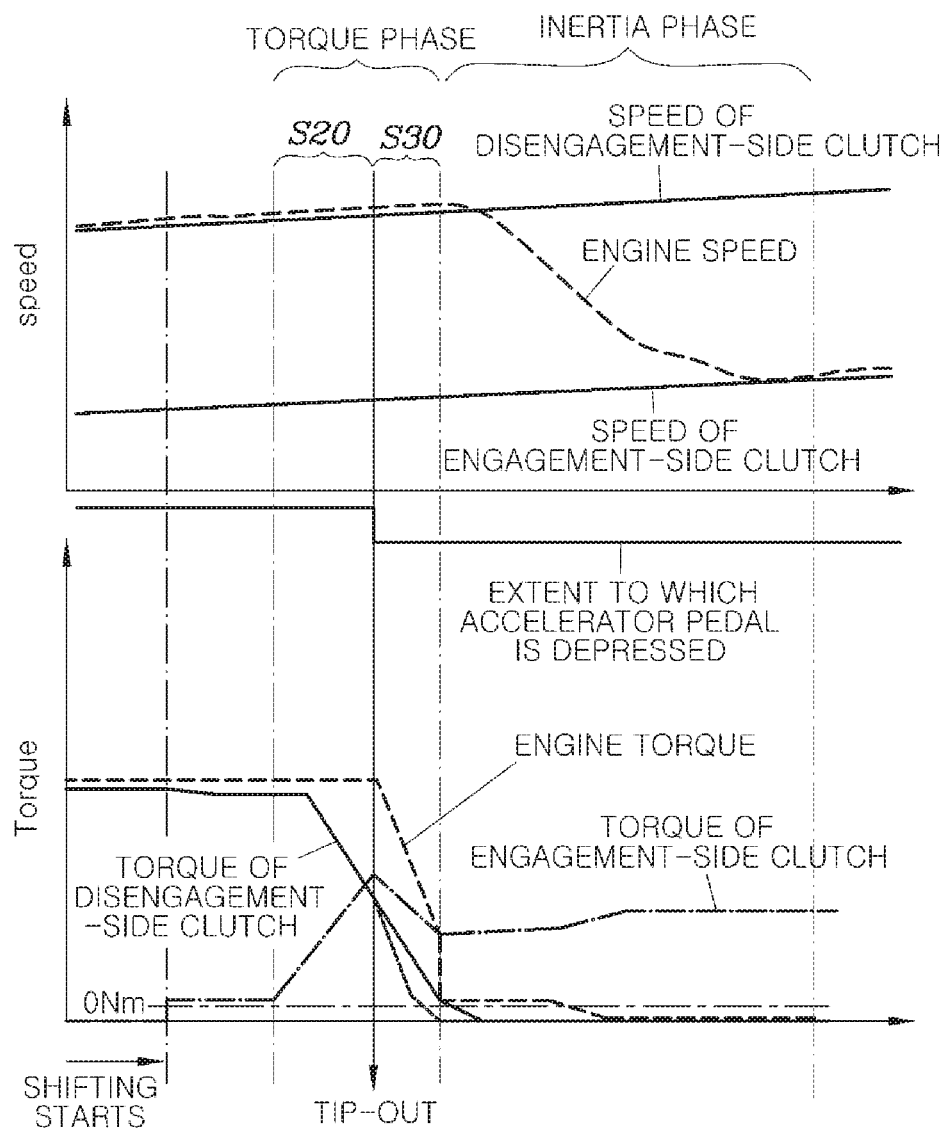
FIG. 3 is a graph describing a control process.

At the above-described tip-out responding step (S30), when the engine torque is reduced due to tip-out as shown in FIG. 3, the torque of the engaging clutch also decreases so as to follow the change in engine torque, as seen in the above equation. Also, in the case of control of the disengaging clutch, the normal control step (S20) is switched to the tip-out responding step (S30), rather than maintaining the normal control step (S20). Accordingly, the torque of the disengaging clutch decrease more quickly than when the normal control step (S20) is maintained, whereby interlocking and shift shock are inhibited.

Even when the occurrence of tip-out causes the torque of the engaging clutch to decrease so as to follow the decrease in engine torque, if the torque of the disengaging clutch is calculated using the same method at the normal control step (S20), the calculated torque of the disengaging clutch may have a relatively higher value. Accordingly, interlocking, in which the sum of the torque of the engaging clutch and the torque of the disengaging clutch exceeds the engine torque, occurs.

For reference, in the tip-out responding step (S30) shown in FIG. 3, the torque of the disengaging clutch, marked with the solid line, shows the torque of the disengaging clutch at the normal torque phase when the normal control step (S20) is maintained. Also, the torque of the disengaging clutch marked with the dotted line shows that the torque is more rapidly decreased by performing the tip-out responding step (S30).

If the extent to which a driver depresses an accelerator pedal is equal to or higher than a certain level while the tip-out responding step (S30) is being performed, the driver is determined to reaccelerate the vehicle. Accordingly, the controller 5 performs a reaccelerating control step (S40), in which the controller 5 calculates the torque of the disengaging clutch in the current control cycle by decreasing the torque of the disengaging clutch in the previous control cycle by an amount that is obtained by dividing the amount that the torque of the disengaging clutch is required to decrease during the remaining time of the torque phase by the remaining time and by further decreasing the decreased torque by the compensation torque, which is calculated in the control cycle shortly before the driver is determined to reaccelerate the vehicle and then controls the disengaging clutch using the calculated torque thereof.

If tip-in occurs during the tip-out responding step (S30), that is, when the APS signal, the output of which results from a driver depressing an accelerator pedal, is equal to or higher than a certain level, for example, 0%, if the torque of the disengaging clutch is rapidly set back to the level at the normal control step (S20), shift shock may occur. In order to inhibit this, the compensation torque, calculated shortly before the driver is determined to reaccelerate, is maintained without change.

In the example of describing the tip-out responding step (S30), the torque of the disengaging clutch is calculated as follows.

disengaging clutch torque (t+1)=58.725−|(5−58.725)/(500−310)|−‖1|+1|=56.442 Nm

Right after the value 56.442 Nm is used to control the disengaging clutch, if the reaccelerating control step (S40) is performed because a driver is manipulating an accelerator pedal, the torque of the disengaging clutch in the current control cycle t may be calculated as follows.

disengaging clutch torque (t)=56.442−|(5−56.442)/(500−320)|−|2|=54.156 Nm disengaging clutch torque (t+1)=54.156−|(5−54.156)/(500−330)|−|2|=51.866 Nm Of course, if the target time period of the torque phase reaches while performing the normal control step (S20), the tip-out responding step (S30), or the reaccelerating control step (S40), the corresponding step ends and the torque phase is completed. Then, the inertia phase proceeds as usual, whereby shifting is completed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A shifting control method for a Dual Clutch Transmission vehicle, comprising:
   determining, by a controller, whether an entry condition is satisfied, the entry condition including information about whether a tip-out occurs while a power-on upshift torque phase is being performed; and
   when the entry condition is satisfied, responding, by the controller, to the tip-out in such a way that the controller controls an engaging clutch using a torque calculated based on an engine torque and a change in an engine speed and in such a way that the controller controls a disengaging clutch using a torque calculated so as to decrease more rapidly than before the entry condition is satisfied.

2. The shifting control method of claim 1, wherein in determining whether the entry condition is satisfied, the entry condition is determined to be satisfied when the tip-out occurs and when the engine torque at a time of occurrence of the tip-out is equal to or greater than a predetermined reference torque.

3. The shifting control method of claim 1, wherein in determining whether the entry condition is satisfied, while the entry condition is not satisfied, a normal control is performed in such a way that the controller calculates the torque of the disengaging clutch in a current control cycle by decreasing the torque of the disengaging clutch in a previous control cycle by an amount that is obtained by dividing an amount that the torque of the disengaging clutch is required to decrease during a remaining time of the torque phase by the remaining time, and controls the disengaging clutch using the calculated torque thereof.

4. The shifting control method of claim 3, wherein in responding to the tip-out, the controller calculates the torque of the disengaging clutch in the current control cycle by decreasing the torque of the disengaging clutch in the previous control cycle by the amount that is obtained by dividing the amount that the torque of the disengaging clutch is required to decrease during the remaining time of the torque phase by the remaining time and by further decreasing the decreased torque by a compensation torque, an absolute value increased by a predetermined reduced torque at every control cycle, and controls the disengaging clutch using the calculated torque thereof.

5. The shifting control method of claim 4, wherein, while responding to the tip-out, when a driver is determined to reaccelerate the vehicle based on an extent to which the driver depresses an accelerator pedal is equal to or higher than a predetermined level, a reaccelerating control is performed in such a way that the controller calculates the torque of the disengaging clutch in the current control cycle by decreasing the torque of the disengaging clutch in the previous control cycle by the amount that is obtained by dividing the amount that the torque of the disengaging clutch is required to decrease during the remaining time of the torque phase by the remaining time and by further decreasing the decreased torque by the compensation torque calculated in the control cycle shortly before the driver is determined to reaccelerate the vehicle, and controls the disengaging clutch using the calculated torque thereof.

6. The shifting control method of claim 5, wherein, when a target time of the torque phase reaches while responding to the tip-out, the normal control, or the reaccelerating control, the controller terminates the tip-out, the normal control, or the reaccelerating control that is being performed.

* * * * *